July 29, 1952 A. S. VOLPIN 2,605,078
AUTOMATIC SEALING GATE VALVE
Filed Nov. 29, 1945 3 Sheets-Sheet 1

A. S. VOLPIN
INVENTOR.
BY Lester B. Clark
+ Ray L. Smith
ATTORNEYS

July 29, 1952     A. S. VOLPIN     2,605,078
AUTOMATIC SEALING GATE VALVE

Filed Nov. 29, 1945     3 Sheets—Sheet 3

A. S. VOLPIN
INVENTOR.

BY Lester B. Clark
    Ray L. Smith
ATTORNEYS

Patented July 29, 1952

2,605,078

UNITED STATES PATENT OFFICE 2,605,078

AUTOMATIC SEALING GATE VALVE

Alexander S. Volpin, Houston, Tex.

Application November 29, 1945, Serial No. 631,713

3 Claims. (Cl. 251—57)

This invention relates to an automatic sealing gate valve.

It is one of the objects of the invention to provide a two-part gate valve wherein the parts are resiliently urged against the seating surfaces, and where a sealing material is automatically maintained in the distribution groove about the downstream port being sealed.

Another object of the invention is to provide a reservoir for sealing material which is subjected to the line pressure leaking into the gate chamber so as to maintain such sealing material about the valve downstream port.

Still another object is to provide a supply of sealing material for an automatically sealing gate valve where the reservoirs for the material are disposed in the gate chamber.

Still another object of the invention is to provide an independent sealing material distribution system for each of the ports of a gate valve.

A still further object of the invention is to provide an arrangement for automatically sealing a gate valve wherein the sealing material is injected into a reservoir in the gate chamber and thereafter subjected to the line pressure leaking into such gate chamber so as to maintain the sealing material under pressure in the distribution system.

Other and further objects of the invention will be readily apparent when the following description is considered in connection with the accompanying drawings wherein.

Figure 1:
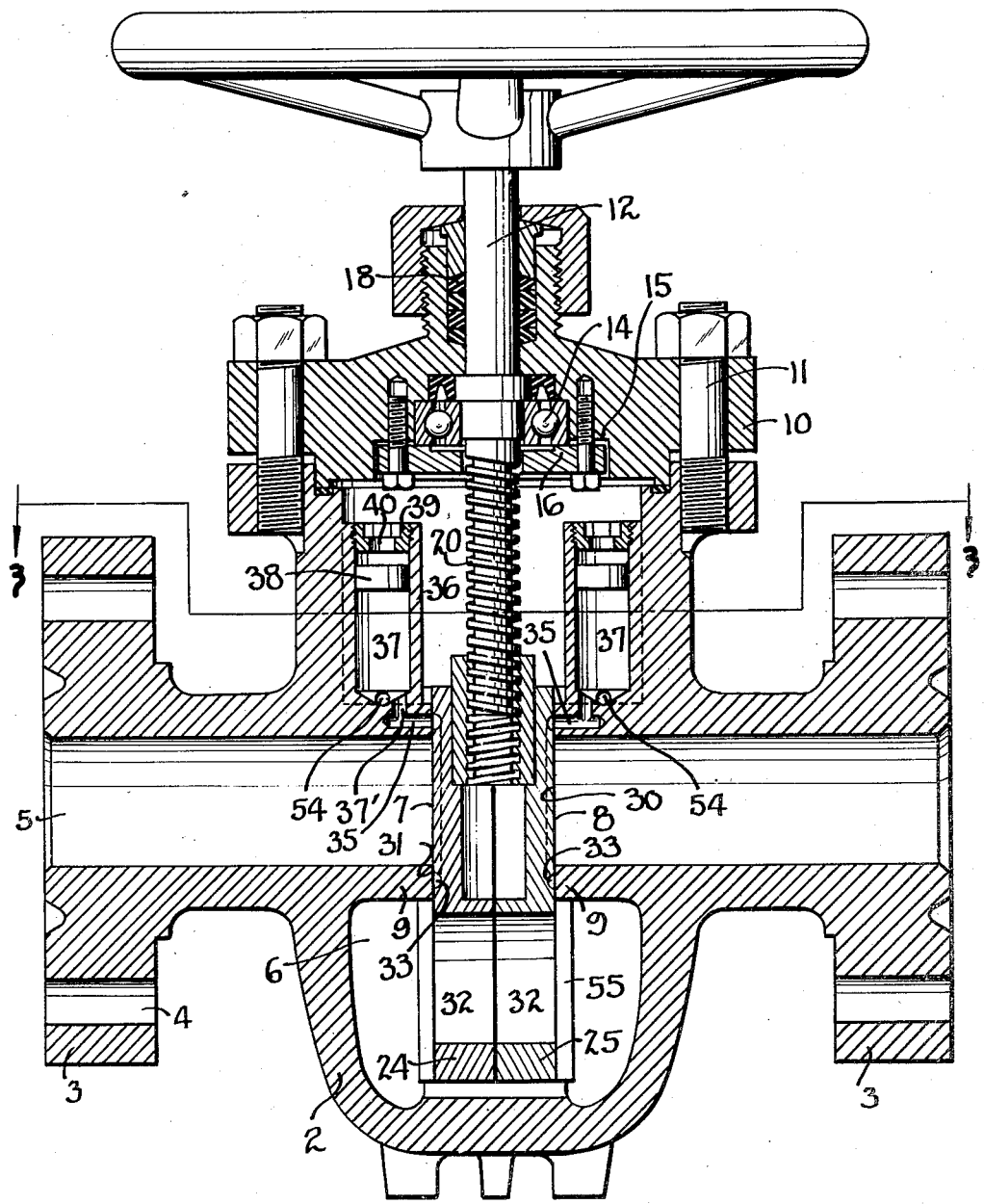
Fig. 1 is a vertical sectional view of a gate valve to which the invention has been applied and illustrating the gate member in closed position.
Figure 2:
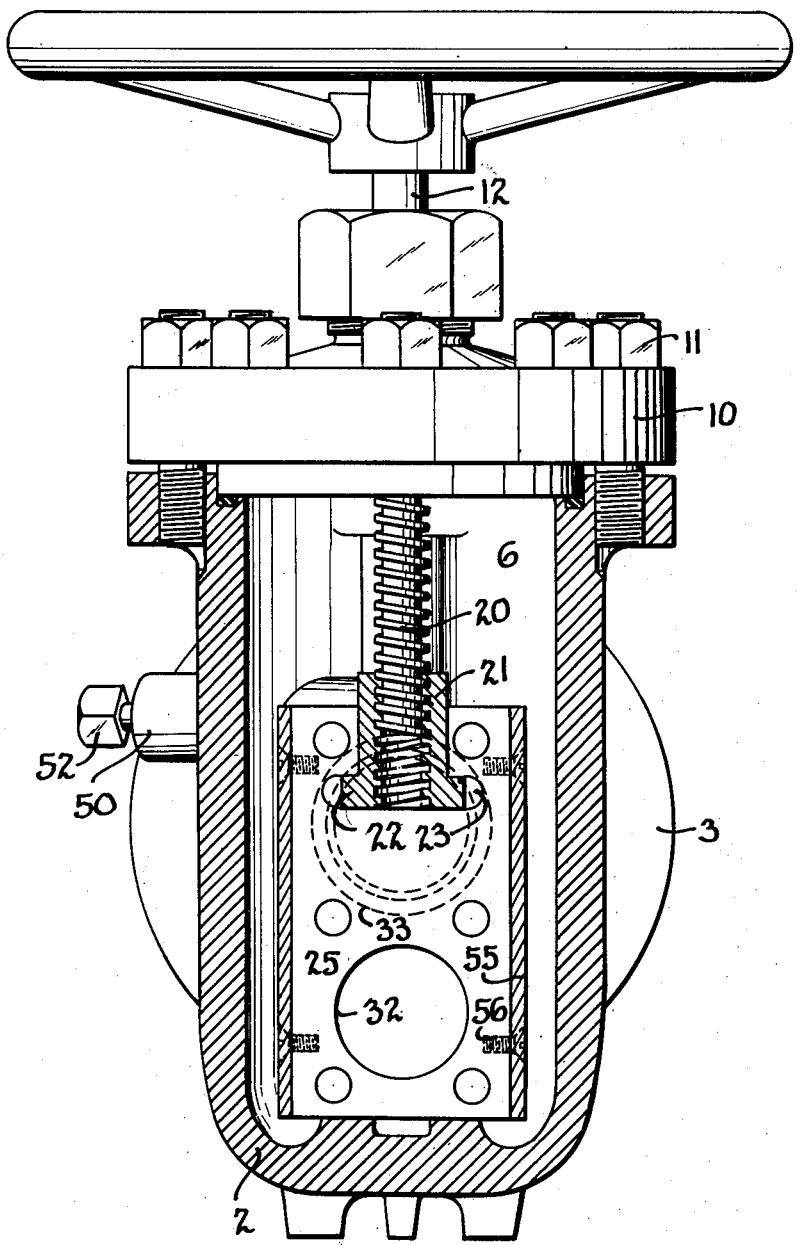
Fig. 2 is a transverse sectional view illustrating the arrangement of the gate operating mechanism.

In Fig. 1 the valve body 2 is provided with the end flanges 3 having the openings 4 therein to receive bolts by which the gate is connected into the pipe line where it is to be used. The body 2 has the flow passage 5 therein which is interrupted by the gate chamber 6 at the flow ports 7 and 8. These ports being formed in the extensions 9 of the metal of the body.

The gate chamber is closed at the top by the bonnet 10 retained in position by the bolts 11 and carrying the gate stem 12 which is of the non-rising type. This stem is rotatable on a bearing 14 held in place in the recess 15 in the cap or bonnet 10 by means of the plate 16. A stuffing box assembly 18 forms a seal about the valve stem.

This stem is threaded at 20 into a bushing 21 having the enlarged portion 22 thereon which fits into the recessed area 23, a portion of which is formed in each of the gate segments 24 and 25. In this manner as the stem is rotated the gate segments 24 and 25 are caused to move in the gate chamber. These two segments are urged apart by the springs 27 best seen in Fig. 3 so that the outer faces 30 thereof will bear against the end faces 31 of the extensions 9 of the valve body.

Each segment is provided with a flow passage 32 which may be moved into alignment with the flow passage 5 when the valve is open.

When the valve is closed however, a seal must be maintained with one of the end faces 31 of the extensions 9, and to this end a circular distribution groove 33 has been formed in the imperforate section of each of the gate segments. This distribution groove 33 is of a size and configuration to fit the end face 31 of the extension 9 when the gate is closed.

Figure 3:
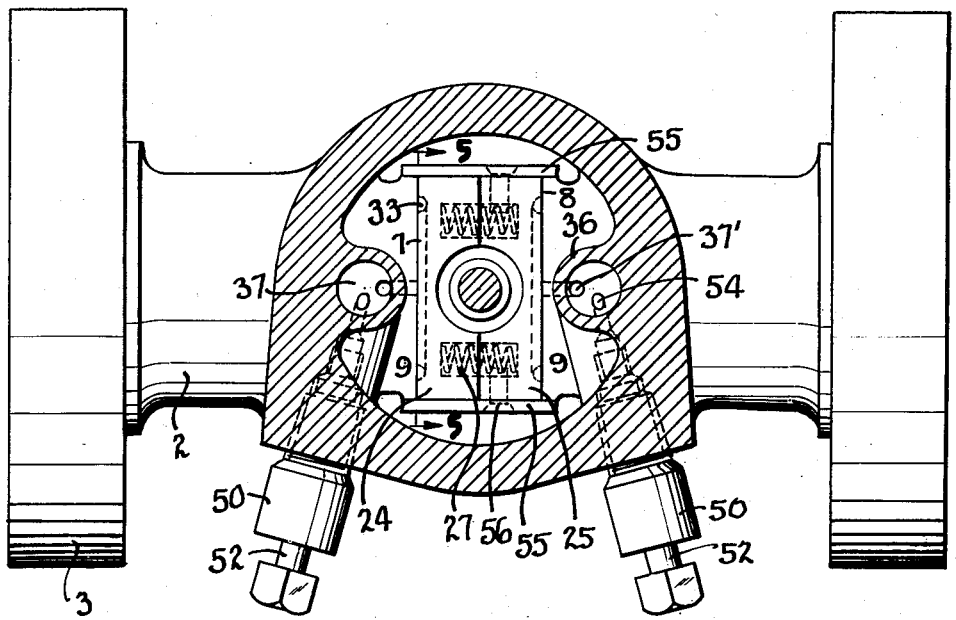
Fig. 3 is a section taken on the line 3—3 of Fig. 1.

In order to supply sealing material to this distribution groove 33 a passage 35 has been formed in the extension 9 and this passage leads into an enlargement or boss 36 best seen in Fig. 3 as being disposed inside of the gate chamber 6 above the flow passage 5 and the extensions 9. This enlargement is hollow to provide a reservoir 37 in which a barrier 38 is slidable in response to pressure. An opening 37' connects the reservoir 37 and passage 35. A nipple 39 is threaded into the upper end of the reservoir 37 and has an opening 40 therein to admit pressure from the gate chamber into the reservoir.

It seems obvious that when the gate is in use that pressure from the high pressure side of flow line 5 will bear against one of the gate segments, and that there will probably be some leakage past this segment and into the gate chamber so that the gate chamber will be under substantially the same pressure as is present in the flow passage.

This pressure is available through the opening 40 against the upper surface of the barrier 38 and tends to move the barrier downwardly into the reservoir so that any sealing material or lubricant in the reservoir will be forced into the distribution groove 33 on the downstream side of the valve. On the downstream flow port such as 7, if for example the high pressure is from the right hand side of the valve, this sealing material will be maintained in the left distribution groove at a pressure in excess of the pressure in the downstream flow passage. This will prevent any leakage into the downstream passage. There are two of these reservoirs 37 as seen in Figs. 1 and 3 so that the valve is a two-way valve in that the high pressure can be applied to either side thereof. The pressures on the upstream reservoir will be balanced.

Figures 4, 5:
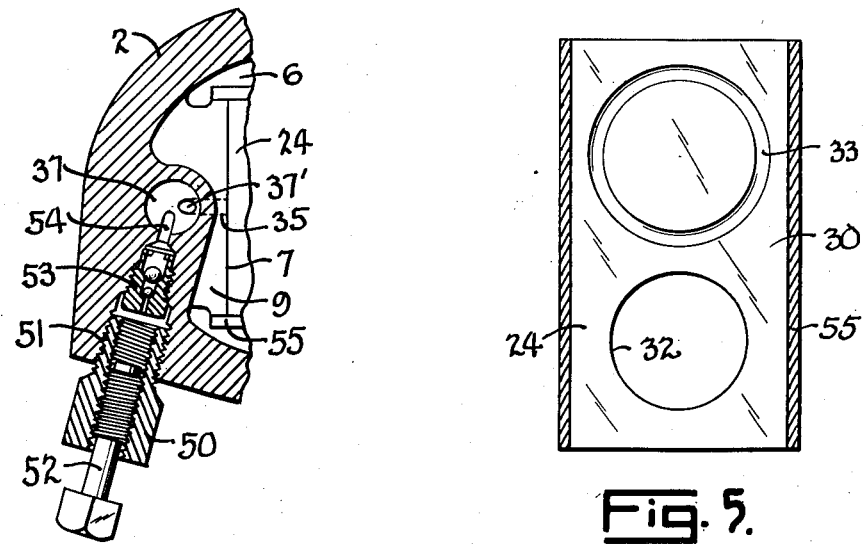
Fig. 4 is a broken detailed sectional view illustrating an arrangement of the mechanism for introducing the sealing material.
Fig. 5 is a face view of one of the gate members.

In order to introduce sealing material into the reservoir 37, a fitting 50 is shown as threaded at 51 into the housing 2, and the spindle 52 is arranged to force sealing material through an individual check valve fitting 53 into the opening 54 which leads into the reservoir 37 as seen in Figs. 1, 3, and 4.

This introduction of sealing material from the bottom of the reservoir of course, causes the barrier 38 to move upwardly in the reservoir until the reservoir is filled. When the line pressure then comes on the reservoir, the downstream barrier will be gradually urged downwardly as the sealing material is utilized in forming a seal. This line pressure on the reservoir automatically maintains sealing material in the downstream distribution groove and the valve is thus prevented from leaking.

While the distribution groove just described is that of the segment 24, a similar distribution grooved structure is supplied for the other segment 25. In order to retain the gate segments 24 and 25 in proper alignment with the ports, the guide plates 55 are positioned on each of the gate members and may be attached to the gate segment 25 by virtue of the screws 56.

Broadly the invention contemplates an automatic sealing gate valve wherein the supply of sealing material is subjected to line pressure to automatically maintain a seal.

What is claimed is:

1. A lubricated gate valve including a housing, a gate chamber therein, a flow passage intersecting said chamber, the inner ends of said passage terminating at opposite sides of said chamber and defining gate seats, a gate in said chamber slidably movable between said seats between open and closed positions, a pair of vertically disposed sealing material reservoirs in the portion of said chamber above said seats, said reservoirs being formed in inwardly extending integral portions of the wall of said chamber on opposite sides of said gate, a conduit extending from each of said reservoirs to the end face of the adjacent seat, circular sealing material distribution grooves in the opposite side faces of said gate which slidably engage the respective seats, said grooves being positioned in said side faces to encircle said flow passage and to register with the outer ends of said conduits when said gate is in the closed position.

2. A lubricated gate valve according to claim 1, wherein the bottoms of said chambers are integrally formed with the outer walls of said flow passage at points spaced rearwardly from said seats.

3. A lubricated gate valve including a housing, a gate chamber therein, a flow passage intersecting said chamber, the inner ends of said passage terminating at opposite sides of said chamber and defining gate seats, a gate in said chamber slidably movable between said seats between open and closed positions, a pair of vertically disposed sealing material reservoirs in the portion of said chamber above said seats, said reservoirs being formed in inwardly extending integral portions of the wall of said chamber on opposite sides of said gate, a conduit extending from each of said reservoirs to the end face of the adjacent seat, and sealing material distributing grooves communicating with the outer ends of said conduits and circularly disposed about said flow passage between the end faces of said seats and the adjacent side faces of the gate when the latter is in closed position.

ALEXANDER S. VOLPIN.

REFERENCES CITED

The following references are of record in the file of this patent:

UNITED STATES PATENTS

| Number | Name | Date |
| --- | --- | --- |
| 1,980,768 | Specht | Nov. 13, 1934 |
| 2,269,887 | Sharp | Jan. 13, 1942 |
| 2,317,657 | Volpin | Apr. 27, 1943 |
| 2,332,282 | Volpin | Oct. 19, 1943 |
| 2,368,183 | Volpin | Jan. 30, 1945 |
| 2,433,638 | Volpin | Dec. 30, 1947 |

FOREIGN PATENTS

| Number | Country | Date |
| --- | --- | --- |
| 256,098 | Great Britain | Aug. 5, 1926 |